United States Patent
Ueno

[11] Patent Number: 6,079,970
[45] Date of Patent: Jun. 27, 2000

[54] APPARATUS FOR ROLLING UP A SHEET OF DOUGH

[75] Inventor: Sadao Ueno, Utsunomiya, Japan

[73] Assignee: Rheon Automatic Machinery Co., Ltd., Tochigi Prefecture, Japan

[21] Appl. No.: 09/069,595

[22] Filed: Apr. 29, 1998

[30] Foreign Application Priority Data

Apr. 30, 1997 [JP] Japan .................................. P09-127944

[51] Int. Cl.[7] .................................................. A21C 11/00
[52] U.S. Cl. ........................ 425/363; 425/335; 425/438; 425/441; 264/318
[58] Field of Search ........................... 425/DIG. 58, 438, 425/441, 363, 335; 264/318; 249/152, 59

[56] References Cited

U.S. PATENT DOCUMENTS

| | | | |
|---|---|---|---|
| 2,173,632 | 9/1939 | Peters | 425/335 |
| 4,741,263 | 5/1988 | Ueno et al. | 99/450.2 |
| 4,905,583 | 3/1990 | Hayashi | 99/450.2 |
| 4,994,293 | 2/1991 | Hayashi | 426/501 |

FOREIGN PATENT DOCUMENTS

| | | |
|---|---|---|
| 62-61533 | 3/1987 | Japan . |
| 63-51653 | 10/1998 | Japan . |
| 63-52858 | 10/1998 | Japan . |

*Primary Examiner*—Harold Pyon
*Assistant Examiner*—Emmanuel S Luk
*Attorney, Agent, or Firm*—Limbach & Limbach L.L.P.

[57] ABSTRACT

To make a piece of bread, such as a croissant, an apparatus is provided to prevent a sheet of dough from being loosely rolled up, to prevent the sheet from being unevenly rolled up, and to firmly roll the sheet up. The apparatus includes a conveyor that feeds the sheet and a roll-up roller that is moveable up and down above the conveyor, so that the rotation of the roll-up roller and the feeding of the conveyor allow the sheet for bread, such as a croissant, to be firmly rolled up.

6 Claims, 6 Drawing Sheets

APPARATUS FOR ROLLING UP A SHEET OF DOUGH

BACKGROUND OF INVENTION

1. Field of Invention

This invention relates to a method and apparatus for rolling up a sheet of dough for bread, a piece of confectionery, etc. Particularly, it relates to a method and apparatus for rolling up a piece of a dough sheet, for example, for croissants, and a piece of a dough sheet on which fillings such as sausages, pieces of cheese, pieces of chocolate, creamy materials, jam, etc. are put.

2. Prior Art

There are many prior-art apparatuses for rolling up a sheet of dough. For example, one such prior-art apparatus is provided with a conveyor belt above which a plate or a belt is positioned so that a space is kept between them. When a sheet of dough is passed through the space, it is rolled up.

When a sheet of dough for a croissant is rolled up, its base is put on the conveyor to face in the front direction, and to intersect with the feeding direction of the conveyor, at right angles. Then, the apparatus starts rolling up the sheet from the base side. However, the sheet may not be completely rolled up due to its characteristics. As a result, the sheet may be loosely rolled up. It may not be rolled up at all, but may be deformed when it passes through the roll-up roller. Also, it may be unevenly rolled up across its entire width. Thus, a device has been made to prevent such a dough sheet from being loosely rolled up (see Japanese Patent Laid-open No. 61-271930 and No. 63-22132). Also, another device has been made to prevent just a part of a sheet from being loosely rolled up (see Japanese Patent Laid-open No. 62-61533).

As stated above, some devices are used in prior-art apparatuses. However, they do not make a tight core of a roll when they start rolling up a sheet of dough. Thus, they cannot firmly roll up the sheet of dough, so that they still do not overcome the disadvantages in the prior-art apparatuses.

Also, no apparatus has been made to roll up a sheet of dough on which solid pieces are put.

Also, in prior-art apparatuses some elements have to be adjusted or replaced by other elements, according to the thickness of a sheet of dough and/or the diameter of a roll, so that the apparatuses are expensive.

SUMMARY OF INVENTION

To overcome the disadvantages of the prior-art apparatuses, this invention is provided. One object of it is to provide a method for rolling up a sheet of dough comprising the steps of feeding the sheet by means of a conveyor, rotating a roll-up roller in the direction that is opposite to the feeding direction of the conveyor, the roll-up roller being positioned above the conveyor, feeding the sheet to the roll-up roller, starting rolling up the sheet with the roll-up roller by kicking upward the end of the sheet, the end being toward the downstream direction of the conveyor, and rolling up the sheet by the rotation of the roll-up roller and the feeding of the conveyor.

Another object of this invention is to provide an apparatus for rolling up a sheet of dough comprising a conveyor to feed the sheet and a roll-up roller, the roll-up roller being positioned above the conveyor and being rotated in the opposite direction to the feeding direction of the conveyor.

Also, another object of this invention is to provide an apparatus for rolling up a sheet of dough comprising a conveyor to feed the piece, a roll-up roller, the roll-up roller being positioned above the conveyor and being rotated in the opposite direction to the feeding direction of the conveyor, and a driving means to rotate and support the roll-up roller such that the roll-up roller can move up and down.

The driving means of this invention can include an internal gear formed on the inner surface of the roll-up roller, a pinion gear that is made to mesh with the internal gear, and a roller to shift the roll-up roller such that the axis of the pinion gear is positioned above that of the roll-up roller in the feeding direction.

The roller of this invention is positioned above the roll-up roller in the feeding direction, and can contact the surface of the sheet. Also, the roll-up roller is held by rollers.

The roll-up roller can swing around a point that is above the axis of the roll-up roller so that the roll-up roller can move up and down.

DETAILED DESCRIPTION OF A PREFERRED EMBODIMENT

Figure 1:
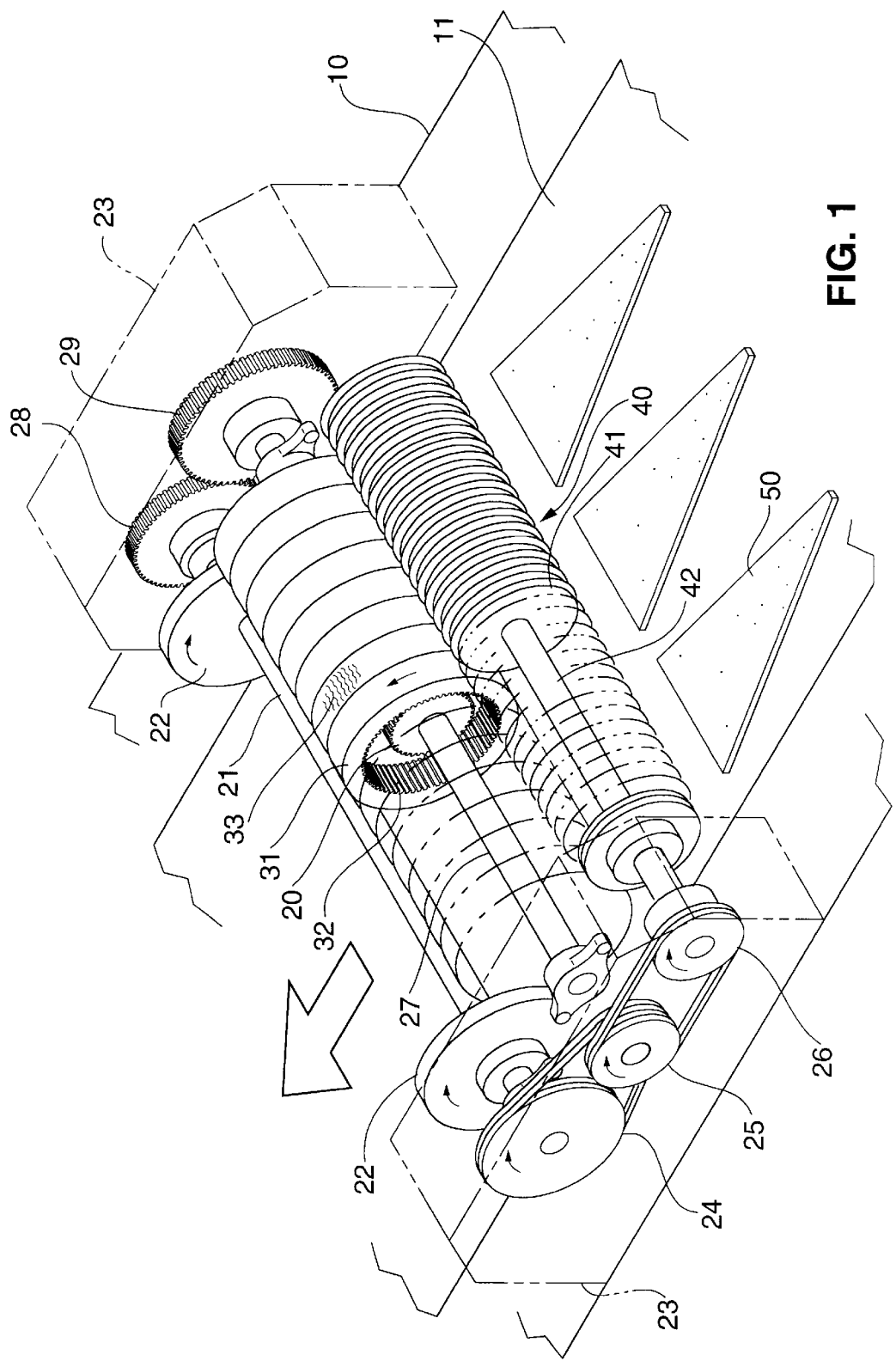
FIG. 1 is a perspective view to generally explain an embodiment of an apparatus for rolling up a sheet of dough according to this invention.

As in FIG. 1, an embodiment of a roll-up apparatus of this invention has a feeding apparatus 10. It includes a conveyor belt 11, on which triangular pieces of a sheet of dough 50 (which are made into croissants in this embodiment) are conveyed. When they are conveyed, the base of each triangular piece 50 is directed in the downstream direction of the conveyor belt 11 (i.e. the direction shown by the arrow in this figure). Then, a roll-up roller 31 rolls up the pieces 50 as it rotates.

In detail, a driving shaft 21 is located horizontally over and across the conveyor belt 11. Frames 23 rotatably and freely support the opposite ends of the driving shaft 21. The driving shaft 21 passes through disks 22 at the center. The disks are fixed near the opposite ends of the driving shaft 21. The disks 22 contact the conveyor belt 11. Thus, as the conveyor belt 11 is moved, the disks 22 are rotated, so that the driving shaft 21 is rotated.

Another driving shaft 27 is located over and across the conveyor belt 11 at a position that is upstream of the driving shaft 21. The driving shaft 27 is used to rotate the roll-up roller 31. The driving shaft 27 is driven by the driving shaft 21 through gears 28 and 29, which are fixed to the ends of the driving shafts 21 and 27, respectively, so that these driving shafts are oppositely rotated. A plurality of pinion gears 20 are fixed around the driving shaft 27. Each pinion gear 20 has a short width. In another embodiment, a wide pinion gear can be fixed around the driving shaft 27.

The roll-up roller 31 is divided into a plurality of elemental rollers, each of which has an internal gear 32, as in FIG.

2. Each internal gear 32 is made to mesh with a respective pinion gear 20. Instead of the meshing of the internal gears 32 and the pinion gears 20, frictional wheels may be used. A pair of flanges 35 may be formed on the opposite end surfaces of the roller 31 or each elemental roller, so that the internal gears 32 on the roll-up rollers 31 are prevented from sliding on the pinion gears 20 and prevented from then disengaging from them. The outer surface of the roll-up roller 31 is covered by belts 33, made of rubber.

An additional roller 40 is located above the roller 31 in the feeding direction. The roller 40 is parallel to the roll-up roller 31. Also, the roller 40 pushes the roll-up roller, so that the axis of the pinion gear 20 is shifted to a position above the axis of the roller 31 in the feeding direction within the cavity of the roll-up roller 31. Thus, each elemental roller of the roll-up roller 31 can be generally swung around the point where the pinion gear 20 meshes with the internal gear 32. A nominal space is kept between the roll-up roller 31 and the conveyor belt 11, and can be adjusted according to the thickness of the sheet to be passed through it.

The roller 40 consists of a plurality of disks 41, which are fixed around a shaft 42. Round belts 43 are wound about the external surfaces of the disks 41. A space is kept between the round belts and the conveyor belt 11, so that the piece 50 of the sheet of dough can be passed through the space. The space can be adjusted according to the thickness of the sheet to be passed through it.

Figure 2:
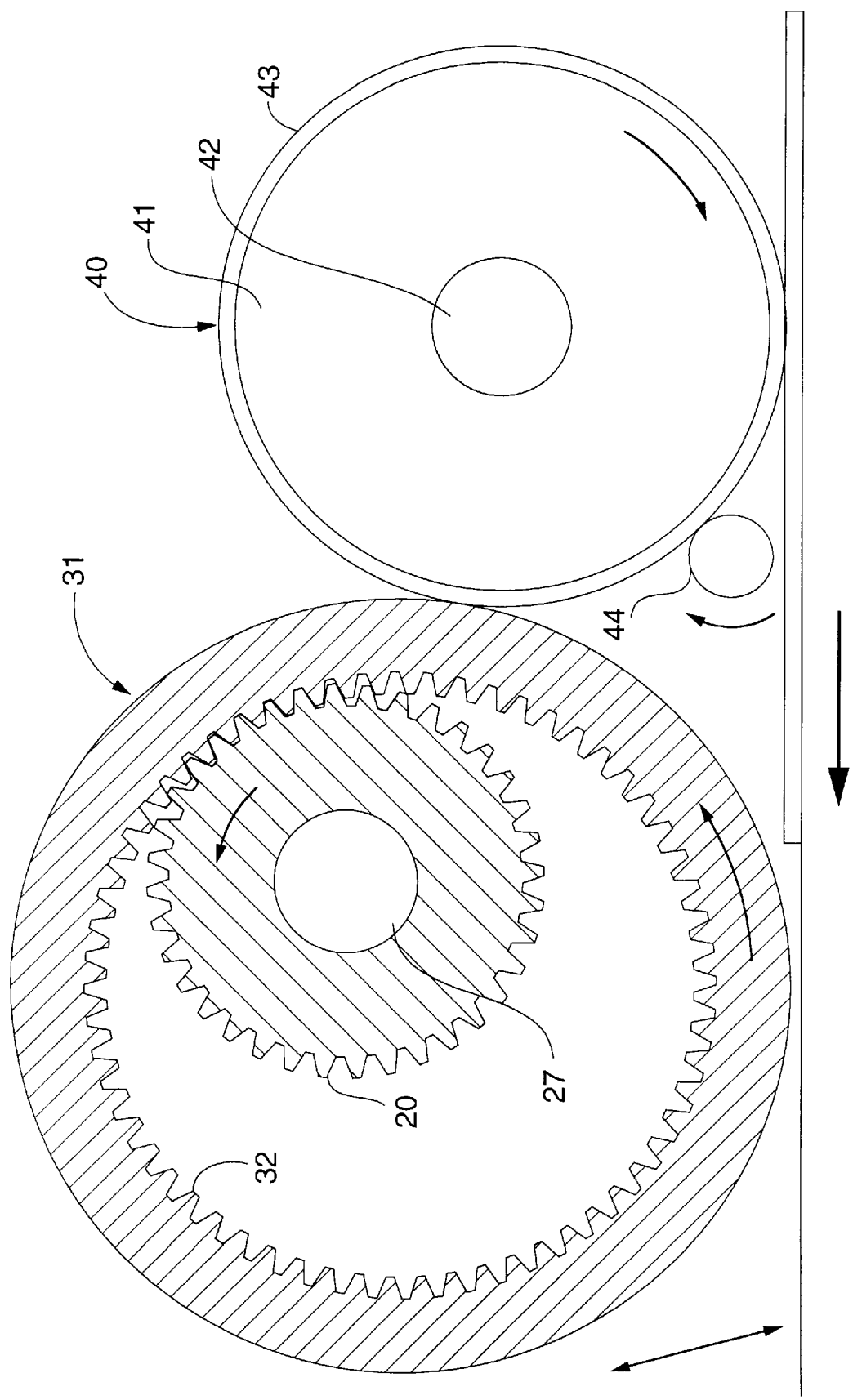
FIG. 2 shows a side view of a first embodiment of a roll-up roller of this invention.
Figure 3:
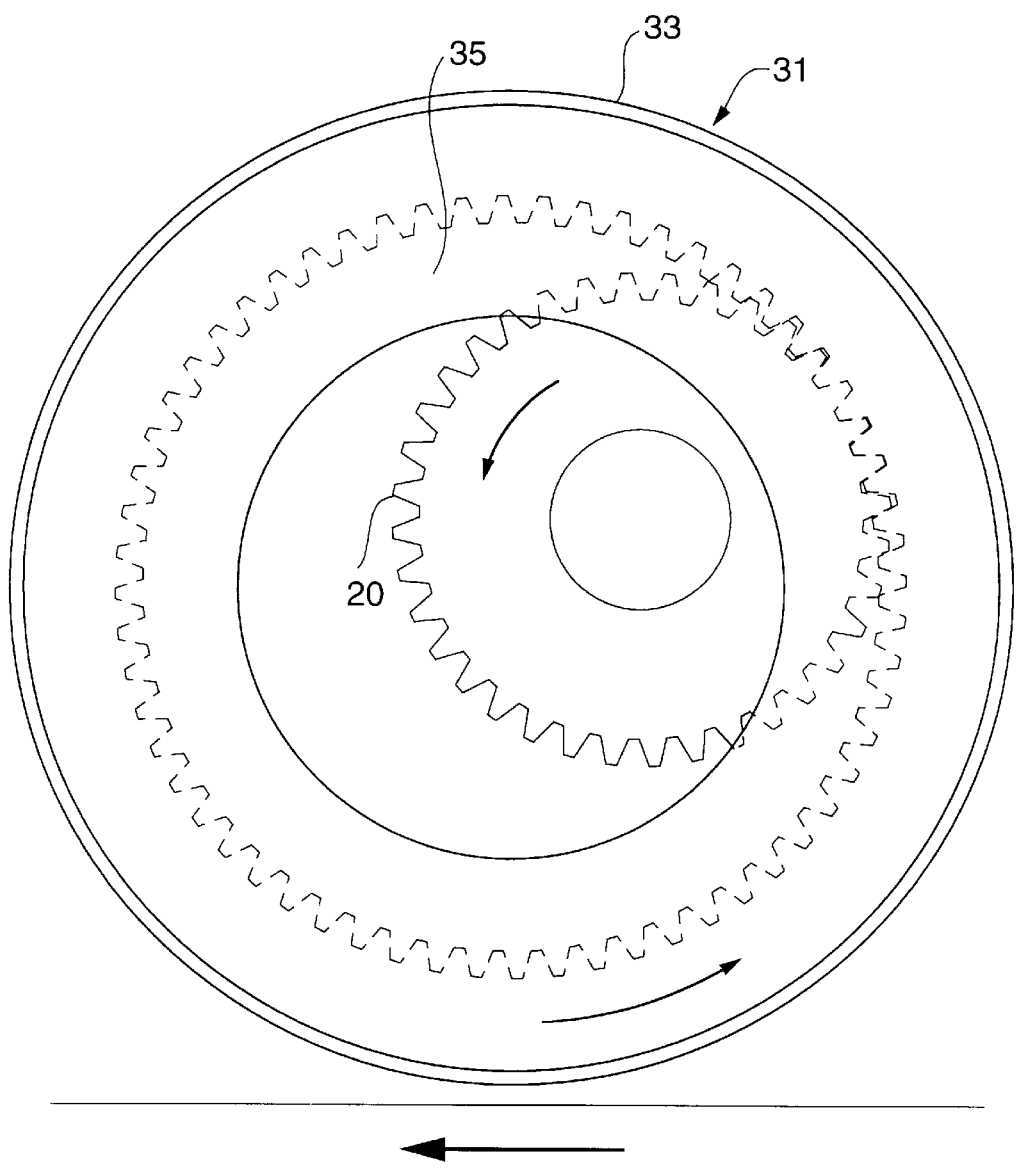
FIG. 3 shows a side view of a part of the first embodiment of the roll-up roller of this invention.

A bar 44, which has a small diameter, is located parallel to the roller 40. As in FIG. 2, it also positioned downstream of the roller 40. The roller 40 and the bar 44 are rotated by the driving shaft 21 through pulleys 24, 25, and 26. The bar 44 is used to remove the piece 50 from the external surface of the roller 40, when the piece 50 adheres to it.

In operation, when the conveyor belt 11 starts feeding the dough sheet, the disks 22 are rotated by the conveyor belt 11. As a result, the shaft 27 is rotated through the gears 28 and 29. The rotation of the shaft 27 and the pinion gear 20 allows the roll-up roller 31 to be rotated opposite to the feeding direction of the conveyor belt 11. Also, through the pulleys 24, 25, and 26 the roller 40 is rotated opposite to the rotating direction of the roll-up roller 31.

When the conveyor 11 conveys the piece 50, it enters the space between the disks 41 of the roller 40 and the conveyor 11. While the piece 50 is being passed through the space, it is fed by the round belts 43. If the piece 50 adheres to the round belts 43 and the surface of the roller 40, the bar 44 can remove it as it rotates.

Then, when the base of the piece 50 contacts the roll-up roller 31, the belt 33 on the roll-up roller 31 kicks up the edge of the base. Then, the piece 50 is bent, so that a firm core is made, so as to make a firmly rolled-up piece. Because the belt 33 is made of rubber, the friction is enhanced between it and the piece 50. Thus, the belt can definitely grip the edges of the pieces when they are conveyed.

As the conveyor belt 11 feeds the piece 50, the roll-up roller 31 rolls it up. As the diameter of the piece that is being rolled up increases, the roll-up roller 31 is gradually swung by the rolled-up piece around the point where the pinion gear 20 meshes with the internal gear 32. As a result, the roll-up roller is lifted, and the gap between the roller 31 and the conveyor 11 increases. The feeding rate of the conveyor belt 11 is higher than the speed of the external surface of the roller 31 when it rotates. Thus, the piece advances along the conveyor belt 11 and passes through the gap between the roll-up roller 31 and the conveyor belt 11. While it passes through the gap, the roll-up roller 31 suitably presses it.

In detail, FIGS. 6a–6d show the piece 50 being rolled up as it is fed in the downstream direction. As in FIG. 6a, the roll-up roller 31 first contacts the edge of the piece 50, so that the edge is kicked up by the outer surface of the roller. Thus, then, as in FIG. 6b, the roll-up roller 31 can easily grip and bend the edge. Then, the roll-up roller 31 presses the downstream side of the piece 50 when it rolls it up. As in FIGS. 6c and 6d, the roll-up roller 31 continues to roll the piece up. As in these figures, as the diameter of the rolled-up piece increases, the gap between the roll-up roller 31 and the conveyor belt 11 widens. Also, as the diameter increases, the angle at which the outer surface of the roll-up roller 31 contacts the piece 50 decreases.

When the roll-up roller 31 rolls up substantially all of the piece, the roll-up roller 31 contacts the piece 50 at a downward angle, so that the roll-up roller 31 presses the upstream side of the piece 50 (not shown). Thus, the pressing force from the roll-up roller 31 can sufficiently affect the entire surface of the piece 50 until it is rolled up, since the roll-up roller 31 begins rolling it up. The prior-art apparatus that has a horizontal plate to roll up a piece of a sheet of dough cannot act like this invention.

Figure 6A:
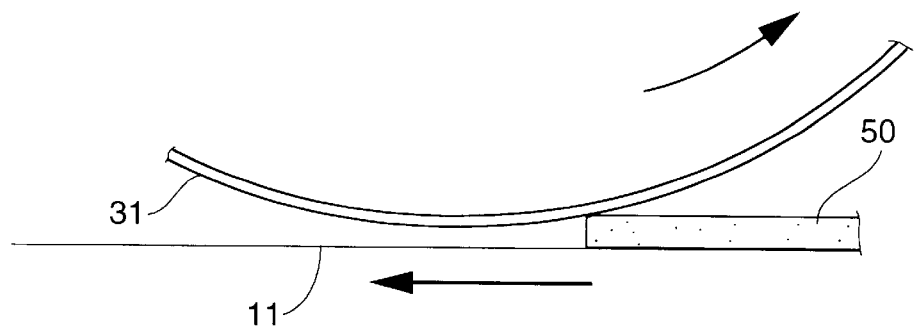
FIGS. 6a–6d show views to explain the function of the roll-up roller of the second embodiment when it rolls the sheet up.
Figure 6B:
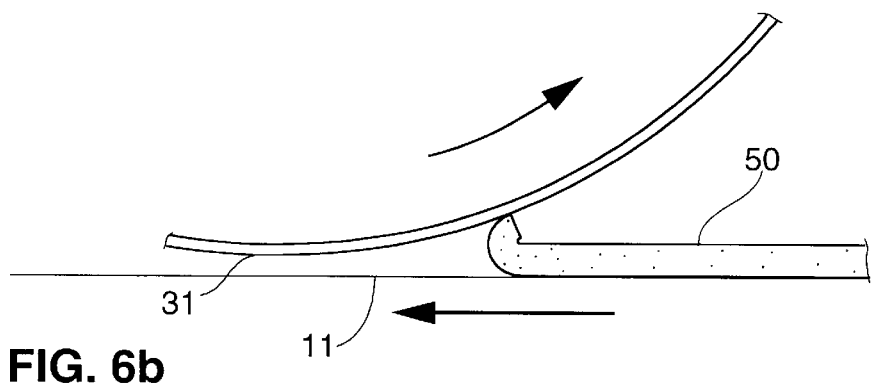
Figure 6C:
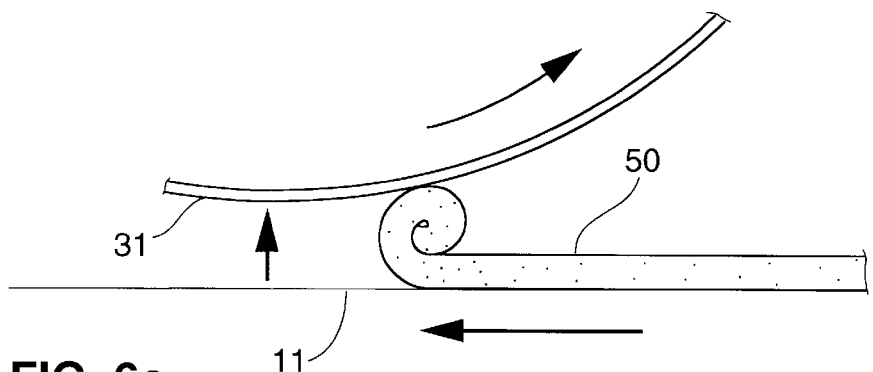
Figure 6D:
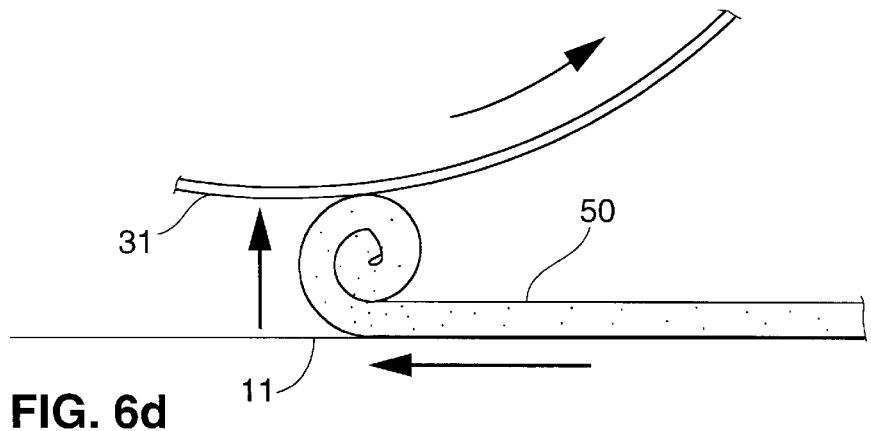
Figure 7A:
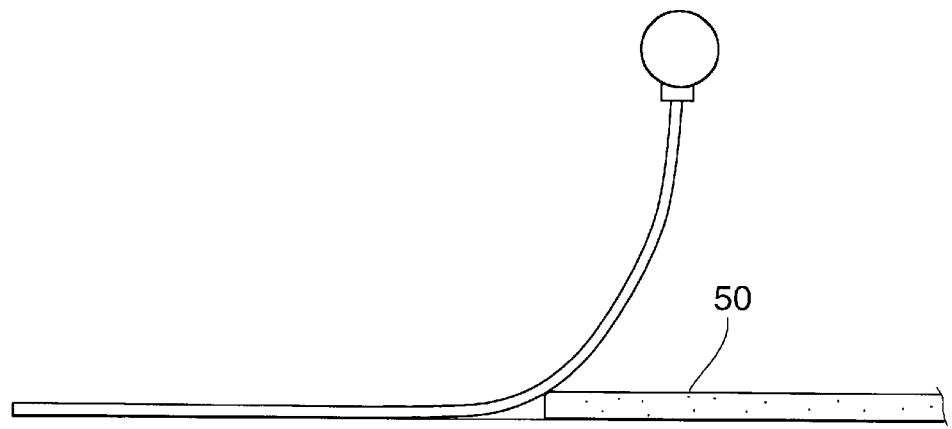
FIGS. 7a, 7b, and 7c show a prior-art apparatus.
Figure 7B:
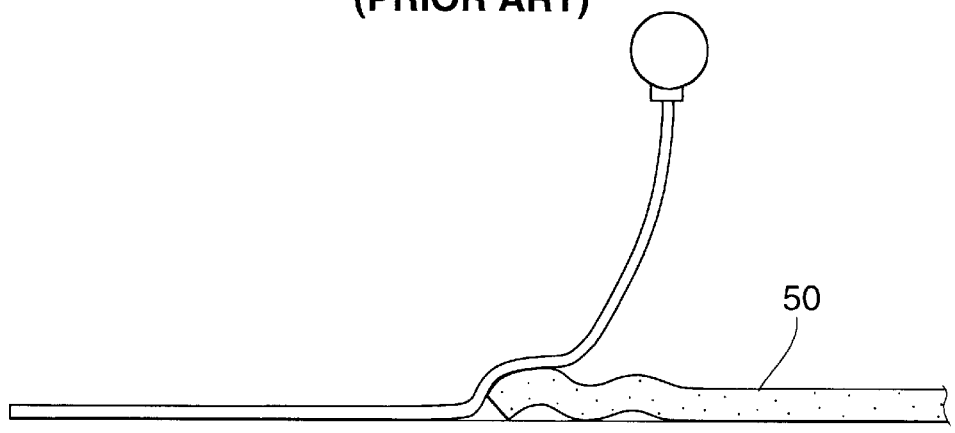
Figure 7C:
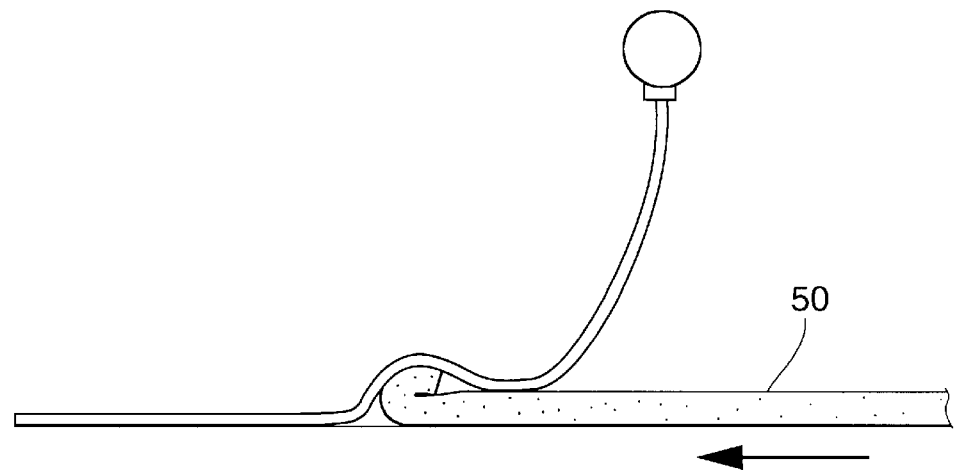

When the roll-up roller 31 starts rolling up the piece as in FIG. 6a, the round belts 43 hold the pieces on the conveyor belt 11. Thus, the roll-up roller 31 can stably grip the pieces when it starts rolling them up, so that the roll-up roller 31 is prevented from unevenly rolling up any piece.

As explained above on FIG. 1, the roll-up roller 31 includes the plurality of elemental rollers along its axis. As explained above, each elemental roller can be swung around the position where the pinion gear 20 meshes with the internal gear 32. If, like this embodiment, the piece 50 is rolled up to make a piece of spindle-shaped bread, such as a croissant, the diameter of the piece is uneven when it is rolled up. Thus, when the piece is passed through the gaps between the elemental rollers and the conveyor belt 11, the elemental rollers can be separately moved upward according to the profile of the spindle-shaped bread. As a result, each elemental roller can effectively press a part of the piece, even if the diameter of the rolled-up piece is uneven when it is rolled up.

Also, as stated above, the roll-up roller 31 holds the piece 50 to grip it sufficiently as it is rolled up and conveyed by the conveyor belt 11. Thus, even if solid fillings, such as sausages, pieces of cheese, pieces of chocolate, etc., are put on the piece 50, it can be firmly rolled up by the roll-up roller 31.

Figure 4:
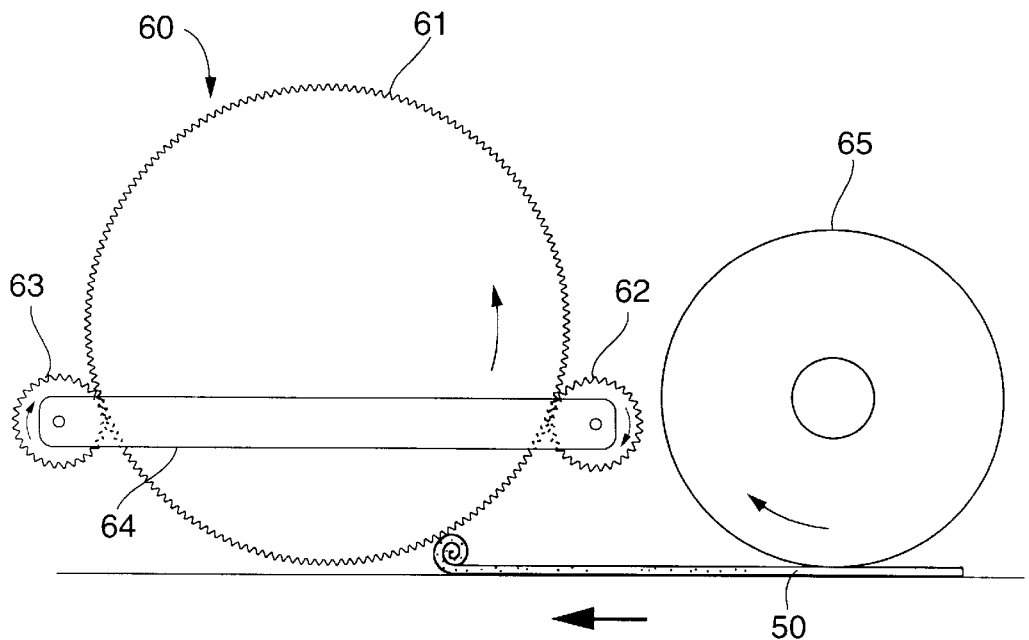
FIGS. 4 and 5 show side views of a second embodiment of a roll-up roller of this invention.
Figure 5:
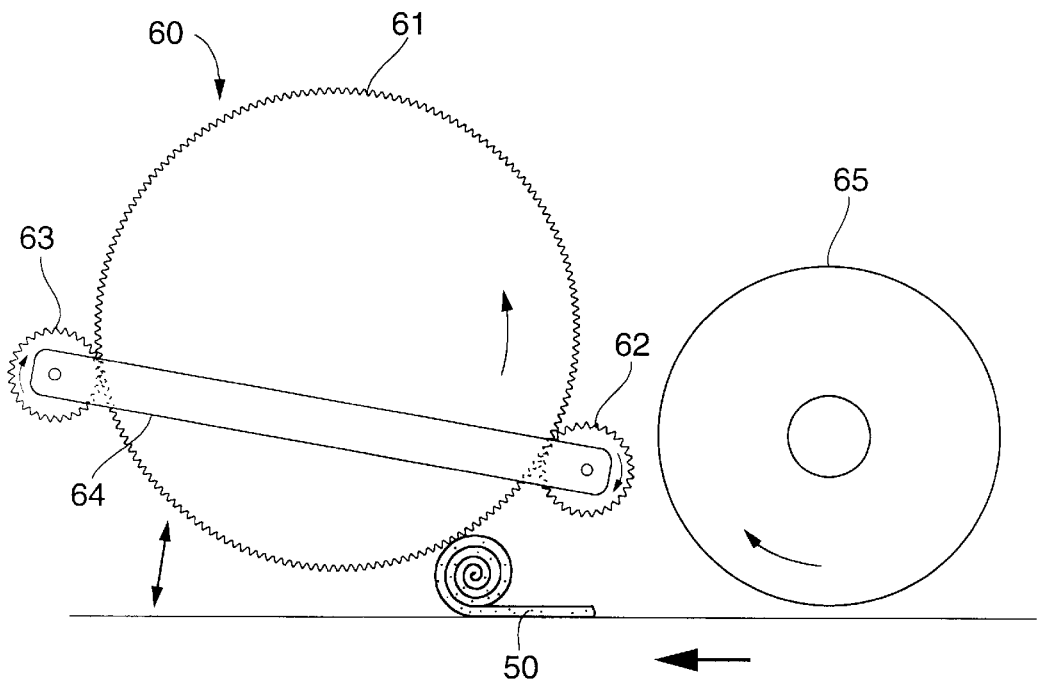

FIGS. 4 and 5 show a roll-up roller apparatus 60 of another embodiment of this invention. It includes a roll-up roller 61. It is held by a roller 62 and a driven roller 63. The rollers 62 and 63 are connected by a link bar 64. The roller 62 is fixed at a position that is above the driven roller 63 in the feeding direction, and is directly connected to a motor (not shown). The driven roller 63 and the link bar 64 can be swung around the roller 62. Also, the roller 61 is swung around the roller 62 when the driven roller 63 and the link bar 64 are swung. Each roller 61, 62, and 63 is geared at its respective end. The rollers 61, 62, and 63 are meshed. A roller 65 is located to press the piece 50 when the piece is fed, so that the roller 61 stably rolls it up.

As the piece 50 is rolled up, the thickness of it increases. As the thickness increases, the rollers 61 and 63 are lifted by the piece that is rolled up. Then, the piece is rolled up and fed toward the downstream direction of the feeding direction. Thus, the roll-up roller apparatus generates an effect that is the same as that of the first embodiment.

According to this invention, the following effects are generated: The roll-up roller can stably grip a sheet when it starts being rolled up. It can readily roll up the sheet. The roll-up roller is prevented from failing to roll up the sheet. The efficiency in rolling up the sheet is enhanced. The sheet on which solid fillings, such as sausages, pieces of cheese, pieces of chocolate, etc. are put can be firmly rolled up. The pressing force by the roll-up roller can sufficiently affect the entire surface of the sheet until it is rolled up, since the roll-up roller begins rolling up it. The elemental rollers can be separately moved upward according to the profile of the spindle-shaped bread. Thus, each elemental roller can effectively press a part of the sheet, even if the diameter of the rolled-up sheet varies across its width when it is rolled up.

What is claimed is:

1. An apparatus for rolling up a sheet of dough, said apparatus comprising:
   a conveyor to feed the sheet of dough in a feeding direction,
   a roll-up roller, the roll-up roller being positioned above the conveyor such that said roll-up roller is free to rotate in the opposite direction to the feeding direction; and
   a driving means coupled to the roll-up roller and configured to rotate and support the roll-up roller such that the roll-up roller can move up and down relative to the conveyor, wherein the driving means includes an internal gear formed on an inner surface of the roll-up roller, a pinion gear that meshes with the internal gear and has an axis, and a roller positioned relative to the roll-up roller so as to shift the roll-up roller relative to the pinion gear such that the internal gear engages the pinion gear and the axis of the pinion gear is positioned above that of the roll-up roller in the feeding direction.

2. The apparatus of claim 1, wherein the roll-up roller has an axis and is mounted to be free to swing around a point that is above the axis of the roll-up roller so that the roll-up roller can move up and down relative to the conveyor.

3. The apparatus of claim 1 wherein the roller is positioned above the roll-up roller in the feeding direction, and can contact the surface of the sheet.

4. The apparatus of claim 3, wherein the roll-up roller has an axis and is mounted to be free to swing around a point that is above the axis of the roll-up roller so that the roll-up roller can move up and down relative to the conveyor.

5. The apparatus of claim 1, wherein the roll-up roller is held by rollers.

6. The apparatus of claim 5, wherein the roll-up roller has an axis and is mounted to be free to swing around a point that is above the axis of the roll-up roller so that the roll-up roller can move up and down relative to the conveyor.

* * * * *